United States Patent [19]

Olivier

[11] Patent Number: 4,948,842
[45] Date of Patent: Aug. 14, 1990

[54] POLYESTERS HAVING IMPROVED IMPACT STRENGTH

[75] Inventor: Errol J. Olivier, Baton Rouge, La.

[73] Assignee: Copolymer Rubber and Chemical Corporation, Baton Rouge, La.

[21] Appl. No.: 265,289

[22] Filed: Oct. 26, 1988

Related U.S. Application Data

[63] Continuation of Ser. No. 858,890, Apr. 25, 1986, abandoned, which is a continuation of Ser. No. 690,613, Jan. 11, 1985, abandoned.

[51] Int. Cl.$^5$ .................... C08F 255/06; C08F 255/02
[52] U.S. Cl. ...................................... 525/286; 525/64; 525/68; 525/263; 525/310
[58] Field of Search ........................ 525/286, 310, 263

[56] References Cited

U.S. PATENT DOCUMENTS

| | | | |
|---|---|---|---|
| 3,868,433 | 2/1975 | Bartz | 525/286 |
| 3,886,227 | 5/1975 | Van Brederode | 525/286 |
| 3,953,541 | 4/1976 | Fuji | 525/286 |
| 4,026,967 | 5/1977 | Flexman | 525/286 |
| 4,172,859 | 10/1979 | Epstein | 428/402 |

*Primary Examiner*—Patricia Short
*Attorney, Agent, or Firm*—Rockey and Rifkin

[57] ABSTRACT

The improvement of toughness and impact strength of polyester resins is achieved by blending 60–90 parts by weight of the polyester with 10–40 parts by weight of an ethylene, propylene, diene rubber, having 2–20 unsaturated C=C linkages per 1000 carbon atoms and which has been grafted with glycidyl methacrylate to a level of 1–10 percent by weight.

17 Claims, No Drawings

POLYESTERS HAVING IMPROVED IMPACT STRENGTH

This application is a continuation of application Ser. No. 858890, filed Apr. 25, 1986, now abandoned, which is a continuation of application Ser. No. 690613, filed Jan. 11, 1985, now abandoned.

FIELD OF INVENTION

This invention relates to polyester polymeric materials and particularly polybutylene terephthalate having improved toughness and impact strength and to materials and methods for producing same. It also relates to polyamide resins having improved toughness and impact strength as well as materials and methods for achieving same.

DESCRIPTION OF PRIOR ART

The utility of thermoplastic polyesters in engineering type applications is limited where toughness and high impact strength are required. Unmodified thermoplastic polyesters typically exhibit room temperature impact strength of 1 ft-lb/inch of notch or less on the Izod scale of impact strength.

Improvement of the toughness and impact strength of thermoplastic polyester has been the subject matter of considerable research and development by the most highly skilled in the art. Much of such earlier research and development has been addressed to the admixture of additives to the polyester, with particular attention being given to the addition of rubber-like or elastomeric materials, such as ethylene-propylene copolymers (EPM) or ethylene propylenepolyene terpolymers (EPDM), with a view towards improving impact strength and toughness without interfering with other of the desirable properties of the polyester. The desired level of improvement has not been achieved with the addition of such rubber-like or elastomeric materials by reason of the relative incompatibility between such rubber-like or elastomeric materials and polyester resins.

Attempts have been made to overcome this problem and increase the compatibility between the rubber-like or elastomeric materials and polyester resins by modification of the rubber-like or elastomeric materials by providing the rubber-like or elastomeric materials with sites that enable the polyester or polycarbonate resins to adhere to the elastomeric materials.

Cope U.S. Pat. No. 3,435,093 discloses blends of polyethylene terephthalate and an ionic hydrocarbon copolymer of a-olefins of the formula R—CH=CH$_2$ in which R is hydrogen (ethylene) or an alkyl radical of 1–3 carbon atoms (propylene-pentene) with the copolymer modified with an $\alpha$–$\beta$–ethylenically unsaturated carboxylic acid containing 3–5 carbon atoms. The Cope patent does not teach or suggest the components of the additive employed in the practice of the invention described and claimed herein, as will hereinafter appear.

The problem was faced directly in the Epstein U.S. Pat. No. 4,172,859, issued Oct. 30, 1979. The Epstein patent is somewhat confusing in that it seeks to cover the waterfront by listing an endless number of materials and combinations thereof for use as additives to improve the toughness and impact strength of polyester and polycarbonate resins. In the Epstein patent, stress is placed on the particle size and tensile modulus of the copolymer additive. While Epstein contemplates the use of ethylene-propylene copolymers and ethylene-propylene-polyene terpolymers from amongst the large number of other varieties of materials and the use of $\alpha$, $\beta$ ethylenically unsaturated carboxylic and dicarboxylic acids and anhydrides as modifying agents to provide sites which adhere to the matrix resin, the Epstein patent does not recognize the concepts of the invention described and claimed as will hereinafter be pointed out.

DESCRIPTION OF THE INVENTION

This invention has been initiated on the thought that an ethylene, $C_3$–$C_{16}$ mono-olefin, polyene and preferably an ethylene, propylene, diene rubbery interpolymer would make a good impact modifier for thermoplastic polyester, if the two could be made compatible. To the present, the two are relatively incompatible because the rubber is a hydrocarbon while the polyester is a much more polar substance. Thus, the objective of this invention is addressed to the modification of the ethylene, mono-olefin, polyene interpolymer rubber greatly to improve its compatibility with polyester to provide an improved impact modifier for the thermoplastic polyester resin.

Briefly described, the features of this invention are embodied in a composition comprising 60–90 percent by weight of a matrix resin in the form of a polyester blended with 10–40 percent by weight of an unsaturated rubber formed by copolymerization of ethylene—one or more mono-olefins and one or more polyenes in which the backbone unsaturated rubber component has been modified with an ester of an $\alpha$, $\beta$-unsaturated acid having an epoxide functionality on the alkoxy portion such as the ester derived from methacrylic acid and an epoxy alcohol and which attaches to the backbone rubber chiefly by way of a grafting reaction with little if any cross-linking reaction.

Polyesters and their method of manufacture are well known to the skilled in the art and are readily available in commerce. While the invention will hereinafter be described in greater detail with reference to polybutylene terephthalate as a preferred polyester such as marketed by the General Electric Plastics Company under the trademark Valox 310 and Valox 315, others of the polyesters such as described in the abovementioned Epstein U.S. Pat. No. 4,172,859 can be used in the practice of this invention for their improvement in toughness and impact strength.

The backbone rubber is formed by interpolymerization of monomers of ethylene, one or more higher mono-olefins having from 3–16 carbon atoms, preferably propylene, plus one or more polyenes.

The polyene monomer containing a plurality of carbon-to-carbon double bonds may be selected from those disclosed in the prior art for use as third monomers in the preparation of ethylene-mono-olefin-polyene terpolymers, including open chain polyunsaturated hydrocarbons containing 4–20 carbon atoms, such as 1,4-hexadiene, monocyclic polyenes and polycyclic polyenes. The polyunsaturated bridged ring hydrocarbons or halogenated bridged ring hydrocarbons are preferred. Examples of such bridged ring hydrocarbons include the polyunsaturated derivatives of bicyclo (2,2,1) heptane wherein at least one double bond is present in one of the bridged rings, such as dicyclopentadiene, bicyclo(2,2,1)hepta-2,5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkenyl-2-norbornenes wherein the alkenyl group contains about 3–20 carbon atoms and preferably 3–10 carbon atoms. Other bridged ring hydrocarbons include polyunsaturated derivatives of bicyclo(2,2,2) octane as represented by bicyclo(3,2,1) octane, polyunsaturated derivatives of bicyclo(3,3,1) nonane, and polyunsaturated derivatives of bicyclo(3,2,2) nonane.

Specific examples of preferred bridged ring compounds include 5-methylene-2-norbornene, 5-ethylidene-2-norbornene, 5-n-propylidene 2 norbornene, 5-isobutylidene-2-norbornene, 5-n-butylidene-2-norbornene, 5-isobutylidene-2-norbornene, dicyclopentadienes; the methyl butenyl norbornenes such as 5-(2-methyl-2-butenyl)-2-norbornene or 5-(3-methyl-2-butenyl)-norbornene, and 5-(3,5-dimethyl-4-hexenyl)-2-norbornene. The elastomer prepared from 5-ethylidene-2-norbornene is much preferred as it has outstanding properties and produces many unusual and unexpected results.

The backbone rubber may contain chemically bound therein molar ratios of ethylene to propylene or other $C_3$–$C_{16}$ mono-olefin varying between 95:10 to 5:90 ethylene:propylene, and preferably between 70:30 to 55:45 ethylene:propylene. The polyene or substituted polyene may be chemically bound therein in an amount of 0.1 to 10 mol percent, and preferably 0.3 to 1 mol percent, or in an amount to provide an actual unsaturation level of 2–10 double bonds per 1,000 carbon atoms in the polymer chain.

The interpolymerization reaction is carried out in the presence of a catalyst in a solvent medium. The polymerization solvent may be any suitable inert organic solvent that is liquid under reaction conditions. Examples of satisfactory hydrocarbon solvents include straight chain paraffins having from 5–8 carbon atoms, with best results often being secured by the use of hexane; aromatic hydrocarbons and preferably an aromatic hydrocarbon having a single benzene nucleus, such as benzene, toluene and the like; and saturated cyclic hydrocarbons having boiling point ranges approximating those of the straight chain paraffin hydrocarbons and aromatic hydrocarbons described above, and preferably saturated cyclic hydrocarbons having 5–6 carbon atoms in the ring nucleus. The solvent selected may be a mixture of one or more of the foregoing hydrocarbons and preferably a mixture of aliphatic and naphthenic hydrocarbons having approximately the same boiling range as normal hexane. It is desirable that the solvent be dry and free of substances that will interfere with the Ziegler type catalyst used in the polymerization reaction.

The interpolymerization is carried out in the presence of a Ziegler catalyst of the type well known to the prior art. Such Ziegler type catalysts are disclosed in a large number of patents, such as U.S. Pats. No. 2,933,480, No. 3,093,620, No. 3,093,621, No. 3,211,709 and No. 3,113,115. Examples of Ziegler catalysts include metal organic coordination catalysts prepared by contacting a compound of a heavy metal of the group IV-a, V-a, VI-a and VII-a of the Mendeleeff periodic system of elements, such as titanium, vanadium and chromium halides with an organo-metallic compound of a metal of groups I, II or III of the Mendeleeff periodic system which contains at least one carbon-metal bond, such as trialkyl aluminum, and allyl aluminum halides in which the alkyl groups contain from 1–20 and preferably 1–4 carbon atoms.

The preferred Ziegler catalyst for interpolymerization is prepared from a vanadium compound and an alkyl aluminum halide. Examples of suitable vanadium compounds include vanadium trichloride, vanadium tetrachloride, vanadium oxychloride, vanadium acetyl acetonate, etc. Activators which are especially preferred include alkyl aluminum chlorides of 3,113,115, having the general formula $R_1Al\ Cl_2$ and $R_2Al\ Cl$ and the corresponding sesquichlorides of the general formula $R_3Al_2Cl_3$, in which R is methyl, ethyl, propyl, butyl or isobutyl. In the catalyst system, the aluminum to vanadium mol ratio of the aluminum and vanadium compounds may be within the range of 5/1 to 200/1 and preferably within the range of 15/1 to 60/1, with best results being secured in the ratio of 40 aluminum to 1 vanadium. These same ratios apply with respect to corresponding compounds of others of the heavy metals substituted for the vanadium compound and the organo-metallic compounds of groups I, II and III for the aluminum compounds. A catalyst prepared from alkyl aluminum sesquichloride, such as the methyl or ethyl aluminum sesquichloride and vanadium oxychloride is preferred in the ratio of 1 mole vanadium oxychloride per 5–300 moles of aluminum and more preferably 15–60 moles of aluminum, with 40 moles of aluminum per mole of vanadium yielding the best results.

The polymerization is preferably carried out on a continuous basis in a reaction vessel closed to the outside atmosphere, which is provided with an agitator, cooling means and conduit means for continuously supplying the ingredients of the reaction including monomer, catalyst and accelerators and conduit means for continuously withdrawing solution containing elastomer, and the catalyst is killed by the addition of a catalyst deactivator.

The preparation of EPDM polymers is well known and is fully described in such patents as U.S. Pat. No. 2,933,480, No. 3,093,621, No. 3,211,709, No. 3,646,168, No. 3,790,519, No. 3,884,993, No. 3,894,999 and No. 4,059,654, amongst many others.

There are a number of factors involved in the modification of the backbone rubber for optimum use as an impact strength improver of polyester resins. It is desirable to effect modification of the backbone rubber with an agent which, when bound to the rubber, still provides active sites in the form of epoxide functions. On the other hand, it is desirable t effect modification of the unsaturated backbone rubber with a modifying agent that involves little, if any, copolymerization or crosslinking, but instead relies chiefly on a grafting reaction for attachment to become a part of the backbone rubber. Too much crosslinking prevents the satisfactory dispersion of the rubber into the polyester resin, which is required for impact strength improvement. By the same token, it is desirable, in accordance with the practice of this invention, to carry out the modification of the backbone rubber using reactants and conditions which do not favor cross-linking under reaction conditions.

In these regards, the concepts described and claimed herein differ basically from the teaching of the aforementioned Epstein U.S. patent No. 4,192,859, which does not recognize the unique function of an epoxide modifier and which favors copolymerization as the mechanism for binding modifying agents with the base polymer. Further, the Epstein patent does not lead one skilled in the art to make use of an unsaturated ethylene, mono-olefin, polyene rubber and avoidance of a crosslinking or other reaction that would involve unsaturated carbon-to-carbon linkages of the base polymer.

As the ester of a methacrylic acid which has an epoxide functionality on the alkoxy portion, it is preferred to make use of glycidyl methacrylate, although other epoxy compounds having the following general formula may be used:

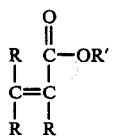

in which R' organic group having an epoxide functionality and R is hydrogen, methyl, ethyl, propyl or other alkyl, aralkyl, cyclic, or aromatic group. Representative of such other modifying agents are glycidyl 2-ethylacrylate, glycidyl 2-propylacrylate and the like.

The catalyst is one that favors grafting reaction over a cross-linking reaction under the reaction conditions to combine the epoxide modifying agent with the unsaturated backbone rubber. For this purpose, it is preferred to make use of a free radicle initiator such as a dialkyl peroxide. In the grafting reaction, use can be made of the catalyst in an amount within the range of 1–5 parts per 100 parts by weight of the unsaturated rubber, and preferably in an amount within the range of 1–2 percent by weight.

The level of graft of the epoxy modifying agent onto the unsaturated backbone rubber is somewhat dependent on the amount of unsaturation in the backbone rubber. It is desirable to make use of an ethylene, mono-olefin, polyene backbone rubber having at least two unsaturated carbon-to-carbon linkages per 1000 carbon atoms and little additional benefit is derived from the use of an unsaturated backbone rubber having more than 20 carbon-to-carbon double bonds per 1000 carbon atoms. In the preferred practice of this invention, use is made of an unsaturated rubber having from 4–10 carbon-to-carbon double bonds per 1000 carbon atoms or which provide for a level of graft within the range of 1–10 percent and preferably 1.5–4 percent by weight of the rubber.

The preparation of unsaturated rubbers having the described characteristics are fully described in U.S. Pat. No. 3,894,999 and others of the aforementioned EPDM patents. They are commercially available under the trade name EPsyn 70A (4.5 C=C per 1000C); EPsyn 55 (9.0 C=C per 1000C), etc. marketed by Copolymer Chemical and Rubber Company of Baton Rouge, La.

The grafting reaction is carried out in solvent solution with the unsaturated rubber present in a concentration which may range from 10–30 percent by weight, with constant stirring, at an elevated temperature within the range of 125–200° C. for a time ranging from ½–2 hours. The reaction condition can be varied depending somewhat upon the type and amount of catalyst and temperature conditions, as is well known to the skilled in the art.

Having described the basic concepts of the invention, illustration will be made by way of the following examples. As used herein:

Reduced solution viscosity (RSV) was measured on a 0.1 weight percent solution in decalin at 135° C.

Melt flow index (MFI) was measured according to ASTM D1238, using condition F.

Gel content is the amount of sample, expressed as a percent, which failed to dissolve in toluene after shaking 4 hours at room temperature. One gram of sample was added to 100 milliliters of toluene. Samples containing less than 5% gel are considered gel free.

Impact strength was measured according to ASTM D256.

Tensile strength was measured according to ASTM D638.

Blends were prepared using three extrusions through a Killion extruder having an L/D ratio of 20/1. Zone temperatures were 450° F., and a die temperature of 425° F. was used. The air cooled strands were chopped into pellets. These were molded into test specimens in a plunger type injection molder with a cavity temperature of 540° F. and a mold temperature of 200° F. The specimens were stored in moisture proof polyethylene bags at least 16 hours before testing.

The following examples will illustrate modifier preparations.

EXAMPLE 1

The starting polymer is a 2.3 RSV EPDM having an ethylene/propylene molar ratio of 65/35 and having as the termonomer 5-ethylidene-2-norbornene, at a level of seven weight percent.

Three hundred grams of the starting rubber, 0.3 grams of Irganox 1076 commercial phenolic antioxidant (Ciba Geigy), and 1150 grams of hexane were charged to a one-gallon Hastelloy C reactor. The reactor was sealed, flushed with nitrogen and heated to 155° C. Thirty grams (10 parts per 100 parts rubber) of glycidyl methacrylate in fifty grams of hexane was pressured into the reactor. This was followed by six grams (2 parts per 100 parts rubber) of dicumyl peroxide (Hercules Di-Cup T) in fifty grams of hexane. The solution was stirred at 500–600 r.p.m. for one hour at 155° C. and 200–250 psig. After the reaction mixture cooled down, the product was recovered by precipitation in acetone followed by drying overnight at 75° C. under pump vacuum. Analysis of a purified sample of the product indicated 2.6 weight percent bound glycidyl methacrylate (GMA). The product had an RSV of 2.2 and a melt flow of 1.2 g/10 minutes. The product was gel free.

EXAMPLE 2

The starting polymer is a 2.2 RSV EPDM having an ethylene/propylene molar ratio of about 65/35 and having as the termonomer ethylidene norbornene at a level of four weight percent. This starting rubber was grafted in the manner of Example 1. Analysis of a purified sample of the product indicated 1.6 weight percent bound GMA. The product had an RSV of 2.1 and a melt flow of 5.2 g/10 minutes. The product was gel free.

EXAMPLE 3

The starting polymer is a 2.7 RSV EPDM having an ethylene/propylene molar ratio of about 65/35 and having ethylidene norbornene as the termonomer at a level of four weight percent. This starting rubber was grafted in the manner of Example 1. Analysis of a purified sample of the product indicated 1.4 weight percent bound GMA. The product had an RSV of 2.7 and a melt flow of 0.6 g/10 minutes. The product was gel free.

EXAMPLE 4

The starting polymer is a 2.8 RSV ethylene propylene (EPM) rubber having an ethylene/propylene molar ratio of about 60/40 and containing no termonomer. This starting rubber was grafted in the manner of Example 1. Analysis of a purified sample of the product indicated 0.4 weight percent bound GMA. The product had an RSV of 2.7 and a melt flow of 1.3 g/10 minutes. The product was gel free.

The following are examples of blends made of the described modified rubbers with polybutylene terephthalate (PBT) thermoplastic polyester, marketed under the trade name Valox 315 by the General Electric Plastics Company.

EXAMPLE 5

Example 5 is an 80/20 blend of Valox 315 polybutylene terephthalate (PBT) thermosplastic polyester and the product of Example 1. Valox 315 is a product of the General Electric Plastics Company.

EXAMPLE 6

Example 6 is an 80/20 blend of Valox 315 and the product of Example 2.

EXAMPLE 7

Example 7 is an 80/20 blend of Valox 315 and the product of Example 3.

EXAMPLE 8

Example 8 is an 80/20 blend of Valox 315 and the product of Example 4.

Control I

Control I is unmodified Valox 315.

Control II

Control II is an 80/20 blend of Valox 315 and the starting rubber of Example 1.

Table I summarizes the properties of the polyester blends and controls.

The following Table I gives the properties of the blends.

TABLE I

| Example | Modifier RSV | Modifier % Diene | Modifier % GMA | Notched Izod Impact Strength (ft.-lbs/ich) | | Tensile Strength psi |
| --- | --- | --- | --- | --- | --- | --- |
| | | | | RT | −20° C. | |
| Control I | — | — | — | 0.8 | 0.5 | 7020 |
| Control II | 2.2 | 7 | 0.0 | 1.8 | 1.3 | 3940 |
| 5 | 2.2 | 7 | 2.6 | 17.4 | 2.0 | 3976 |
| 6 | 2.1 | 4 | 1.6 | 16.8 | 2.6 | 4571 |
| 7 | 2.7 | 4 | 1.4 | 14.7 | 1.9 | 4437 |
| 8 | 2.7 | 0 | 0.4 | 6.6 | 2.1 | 4677 |

It will be seen from the table that the improvement in impact strength derived from the incorporation of ungrafted EPDM is insignificant in comparison with that achieved by the incorporation of EPDM's grafted with GMA. The results also clearly illustrate a relationship between the degree of GMA grafting and the level of unsaturation in the base rubber. The rubbers of Examples 1–4, corresponding to the modifiers of Examples 5–8, were all reacted with 10 parts GMA per 100 parts rubber and 2 parts dicumyl peroxide per 100 parts rubber under identical reaction conditions. The base rubber having a diene content of seven weight percent provided a degree of grafting of 2.6%, the base rubbers having a diene content of four percent provided a degree of grafting of about 1.5%, and the base rubber containing no diene provided a degree of grafting of only 0.4%. The significance of this is demonstrated by the fact that the modifier of Example 8, having the lowest degree of grafting, is the least effective of the grafted modifiers.

It was observed that blends of ungrafted EPDM and polyester do not only show little improvement in impact strength, but also exhibit visual incompatibility in the form of a "plywood" morphology. This is especially true when molded specimens are flexed or fractured as in the Izod impact test. Blends of polyester and the GMA grafted EPDM's described here showed no evidence of delamination, but rather exhibited complete visual homogeneity.

It is obvious from the foregoing that the grafting of the rubber with glycidyl methacrylate (GMA) provides compatibility between the grafted rubber and polyester. The mode of action may be purely physical attraction between polar groups in the polyester and the GMA groups attached to the EPDM backbone rubber. Alternatively, a covalent bond forming reaction between the polyester and the rubber grafted with the glycidyl methacrylate, as envisioned in Equation 1 may be the explanation, in which the OH groups of the polyester are provided either by hydroxyl or carboxyl groups which are the normal end groups for polyester.

EQUATION 1

Polyester-OH +                      Equation 1

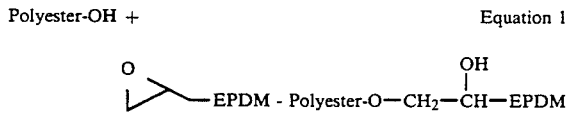

The following examples illustrate the use of other monomers having epoxy functionalities in the preparation of modified rubbers and blends thereof with polyester resins to improve impact strength, with results tabulated in Table II.

EXAMPLE 9

The base rubber is that of Example 1. This base rubber was reacted with 10 parts glycidyl acrylate and 2 parts dicumyl peroxide per 100 parts rubber in the manner described in Example 1. The product was not examined for degree of grafting. The RSV of the product could not be measured because it was insoluble. The melt flow of the product was 0 g/10 minutes. The product contained 64.3% gel. These results are attributed to cross-linking of the rubber during the graft reaction.

EXAMPLE 10

The base rubber is that of Example 4. This base rubber was reacted with 10 parts glycidyl acrylate and 2 parts dicumyl peroxide per 100 parts rubber in the manner of Example 1. The product had an RSV of 2.6 and a melt flow of 1.8. The product was gel free. This implies that, in the case of glycidyl acrylate, the crosslinking which accompanies grafting may be controlled by adjusting the level of unsaturation in the base rubber.

EXAMPLE 11

Example 11 is an 80/20 blend of Valox 315 and the product of Example 9.

EXAMPLE 12

Example 12 is an 80/20 blend of Valox 315 and the product of Example 10.

TABLE II

Blends of Valox 315 and Ethylene-Propylene (EPM and EPDM) Rubbers Grafted with Various Monomers[1]

| Example | Modifier % Diene | Graft Monomer | Notched Izod Impact Strength (RT, ft.-lbs./inc.) | Comments |
|---|---|---|---|---|
| Control II | 7 | 0 | 1.8 | Ungrafted EPDM |
| 5 | 7 | GMA | 17.4 | |
| 8 | 0 | GMA | 6.6 | |
| 11 | 7 | GA | 3.4 | Modifier cross linked |
| 12 | 0 | GA | 7.3 | |

[1]All were grafted under identical conditions using a 10 part monomer, 2 part dicumyl peroxide per 100 parts rubber charge. GMA = glycidyl methacrylate, GA = glycidyl acrylate.

It will be seen that compatibility between EP rubber and polyester is improved by grafting with glycidyl acrylate. In the case of the EPM base rubber (Example 12), the improvement with GA is about equivalent to that achieved by grafting GMA (Example 8), as reflected by the similar impact strengths of the 80/20 blends. The GA grafted EPDM (Example 11), on the other hand, is a much poorer modifier for Valox 315 than the GMA grafted EPDM (Example 5). This is believed to result from the ineffective mixing during blending, because the modifier was cross-linked.

It has been found that this deficiency can be overcome somewhat by minimizing the amount of cross-linking thereby to enhance the use of a glycidyl acrylate or other acrylate having an epoxide functionality in modifying the unsaturated backbone rubber used as an additive to improve impact strength of polyester resins. It has been found that this can be achieved in accordance with a further practice of this invention by carrying out the grafting reaction in the presence of an additional component that acts to inhibit cross-linking, such that the latter is resigned to engage more beneficially in the grafting reaction. This can be achieved by the inclusion of, for example, methyl methacrylate as an additional monomer in grafting the unsaturated rubber with glycidyl acrylate, as illustrated by the following examples.

EXAMPLE 13

The base rubber of Example 1 was reacted with 5 parts GMA and 2 parts dicumyl peroxide per 100 parts rubber in the manner of Example 1. Analysis of a purified sample of the product indicated 2.8 percent bound GMA. The gel-free product had an RSV of 2.4 and a melt flow of 0.7 g/10 minutes. The maintenance of a high degree of grafting in comparison with the 10 part monomer charge is taken to indicate that, as regards the graft reaction, the monomer is in excess.

EXAMPLE 14

The base rubber of Example 1 was reacted with 5 parts glycidyl acrylate and 2 parts dicumyl peroxide per 100 parts rubber in the manner of Example 1. The product was analyzed to contain 3.4% bound glycidyl acrylate. No RSV could be obtained because the sample was insoluble. The product had melt flow of 0 g/10 minutes. The product had a gel content of 48.7%.

EXAMPLE 15

The base rubber of Example 1 was grafted with 5 parts glycidyl acrylate, 5 parts methyl methacrylate, and 2 parts dicumyl peroxide per 100 parts rubber in the manner of Example 1. Analysis of a purified sample of the product indicated a degree of grafting of 2.0% GA. No analysis for bound methyl methacrylate was made. The product had an RSV of 2.5 and a melt flow of 0.5 g/10 minutes. The product was gel free.

EXAMPLE 16

The base rubber of Example 1 was reacted with 10 parts methyl methacrylate and 2 parts dicumyl peroxide in the manner of Example 1. The product was not analyzed for degree of grafting. The product had an RSV of 2.4 and a melt flow of 2.4 g/10 minutes. The product was gel free.

EXAMPLE 17

Example 17 is an 80/20 blend of Valox 315 and the product of Example 13.

EXAMPLE 18

Example 18 is an 80/20 blend of Valox 315 and the product of Example 14.

EXAMPLE 19

Example 19 is an 80/20 blend of Valox 315 and the product of Example 15.

EXAMPLE 20

Example 20 is an 80/20 blend of Valox 315 and the product of Example 16.

The results of the series of Examples 13-20 are set forth in the following Table III.

TABLE III

| Example | Modifier Example | Monomers[1] (Parts Charged) | Notched Izod Impact Strength (RT, ft-lbs./inch) |
|---|---|---|---|
| 17 | 13 | GMA (5) | 16.02 |
| 18 | 14 | GA(5) | 8.3[2] |
| 19 | 15 | GA/MMA (5/5) | 19.6 |
| 20 | 16 | MMA (10) | 0.9 |

[1]GMA = glycidyl methacrylate, GA = glycidyl acrylate, MMA = methyl methacrylate.
[2]This is an average of nine impacts. The values ranged from 3 to 11 ft.-lbs./inch.

This time an effective modifier for polyester was achieved in Example 15 (blend Example 19) using glycidyl acrylate as the grafting monomer. The modifier of Example 14 (blend Example 18) still did not perform equal to that of the EPDM-g-GMA of Example 13 (blend Example 17). Also the EPDM-g-MMA of Example 16 (blend Example 20) was an ineffective polyester impact modifier. Apparently the methyl methacrylate can co-graft polymerize with the glycidyl acrylate and, in addition, provide an alternative mechanism of termination, which lowers the level of cross-linking.

It is believed that this effect may be a general one. That is it may extend to the cases of other monomers such as most acrylates, vinyl monomers, and acrylonitrile, which promote cross-linking of EPDM during grafting possibly by reason of the mechanism of graft chain termination. Incorporation of graft comonomers which alter the termination mechanism may be used to eliminate undesirable cross-linking which often renders the product useless in the application desired.

Beneficial use of the additives described for improvement of toughness and impact strength of polyesters has been found to extend to the improvement of toughness and impact strength of caprolactams, and particularly polyamides of the type marketed under the trade name Nylon. Suitable blends can be made within the range of 60-90 parts by weight of the polyamide blended with 10-40 parts by weight of the additive. This extension of beneficial use as an impact strength improver for polyamides has been verified by the following examples.

EXAMPLE 21

The starting polymer is that of Example 1. The modifier was prepared in the manner of Example 1. Analysis of a purified sample of the product indicated 2.8% bound GMA. The product had an RSV of 2.4 and melt flow of 0.9 g/10 minutes. The product was gel free.

EXAMPLE 22

Example 22 is an 80/20 blend of Nylon 6 and the product of Example 21.

Control III

Control III is the unmodified Nylon 6 of Example 22. It is a polycaprolactam having a degree of polymerization of about 200 and a formic acid solution viscosity of 70. The melt flow of the Nylon 6 under Condition L of ASTM D1238 was 14 g/10 minutes.

EXAMPLE 23

Example 23 is a 75/25 blend of the nylon of Control III and the product of Example 21.

The properties of Examples 22, 23 and Control III are given in Table IV. The EPDM-g-GMA is seen to provide a significant enhancement of the impact strength of Nylon 6.

TABLE IV

Nylon/EPDM-g-GMA Blends

| Example | % Modifier | Notched Izod Impact Strength (ft.-lbs./inch) RT | Notched Izod Impact Strength (ft.-lbs./inch) −20° C. | Tensile Strength psi |
| --- | --- | --- | --- | --- |
| Control III | 0 | 0.9 | 0.7 | 10960 |
| 22 | 20 | 15.6 | 4.7 | 6260 |
| 23 | 25 | 19.0 | 6.5 | 5810 |

Considerable economic advantage can be realized when the preparation of the ethylene, mono-olefin, polyene interpolymer is interrupted at the cement stage to enable the described grafting reaction to be carried out while the formed interpolymer is in solution in the solvent in which the monomers are polymerized. This avoids the additional step of recovery of the polymer to provide the solid unsaturated rubber and subsequent dissolution in a solvent medium per the grafting reaction, as in the previous examples. This concept also enables the grafting reaction to be carried out on unsaturated interpolymers having molecular weights so low as to inhibit recovery as a solid, but which often finds greater utility as an impact improver for both polyesters and polyamides. This concept is illustrated and described in the Joffrion U.S. Pat. No. 4,340,682 and in the co-pending Olivier application Ser. No. 537,789, filed July 30, 1983, and entitled Polyamide Grafted EPM Blend.

It will be understood that changes may be made in the details of formulation and operation without departing from the spirit of the invention, especially as defined in the following claims.

I claim:

1. An additive for blending with polyester or polyamide resins as an impact strength improver comprising an unsaturated backbone rubber formed by interpolymerization of ethylene, at least one mono-olefin containing 3 to 16 carbon atoms and polyene in which the backbone rubber has been grafted in a solvent medium in the presence of a free radical initiator with an ester having the structure:

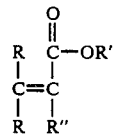

wherein R' is an organic group having an epoxide functionality, R'' is alkyl and R is selected from the group consisting of hydrogen, alkyl, aralkyl, cycloalkyl and aryl, said ester being present in an amount of 1 to 10 percent by weight of the rubber, said additive being substantially gel free.

2. A composition as claimed in claim 1, in which the mono-olefin monomer is propylene.

3. A composition as claimed in claim 1, in which the ethylene and propylene are present in the backbone rubber in the molar ratio of 70:30 to 45:55 ethylene:propylene.

4. A composition as claimed in claim 1, in which the polyene is a polyunsaturated bridged ring hydrocarbon or halogenated derivative thereof.

5. A composition as claimed in claim 1, in which the polyene is 5-ethylidene-2-norbornene.

6. A composition as claimed in claim 1, in which the polyene is bound in the rubber in an amount to provide 2-20 C=C groups per 1000 carbon atoms.

7. A composition as claimed in claim 1, in which the polyene is bound in the backbone rubber in an amount to provide 2-10 C=C groups per 1000 carbon atoms.

8. A composition as claimed in claim 1, in which the ester grafted onto the backbone rubber is glycidyl methacrylate.

9. A composition as claimed in claim 1, in which the level of graft is within the range of 1.5-4.0 percent by weight of the rubber.

10. An additive for blending with polyester as polyamide resins as an impact strength improver comprising an unsaturated backbone rubber formed by interpolymerization of ethylene, at least one mono-olefin containing 3 to 16 carbon atoms, and a polyene in which the backbone rubber has been grafted in a solvent medium in the presence of a free radical initiator with a graft monomer selected from the group consisting of (a) an alkylacrylate with epoxy functionality at the alkoxy position and (b) an acrylate with epoxy functionality at the alkoxy position used in combination with a cross-linking-inhibiting monomer in the form of methyl methacrylate, said cross-linking-inhibiting monomer being used in an amount sufficient to minimize cross-linking of the rubber, said additive being substantially gel free.

11. A composition as claimed in claim 10 wherein the graft monomer is glycidyl methacrylate.

12. A composition as claimed in claim 10, wherein said graft monomer is one of those specified in paragraph (b).

13. An additive for blending with polyester, polycarbonate or polyamide resins as an impact strength improver comprising an unsaturated backbone rubber formed by interpolymerization of ethylene, at least one mono-olefin containing 3 to 16 carbon atoms and polyene in which the backbone rubber has been grafted in a solvent medium in the presence of a free radical initiator with an ester having the structure:

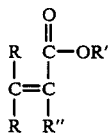

where R' is an organic group having an epoxide functionality, R is selected from the group consisting of hydrogen, alkyl, aralkyl, cycloalkyl and aryl, and R" is hydrogen, and also in the presence of a methyl methacrylate monomer to inhibit cross-linking of the ester with the unsaturated rubber, said additive being substantially gel free.

14. An additive as claimed in claim 13, in which the ester is glycidyl acrylate.

15. An additive as claimed in claim 13, in which the polyene is a diene.

16. An additive as claimed in claim 15, in which the diene is 5-ethylidene-2-norborene.

17. An additive as claimed in claim 14, in which the unsaturated rubber is grafted with the ester to a level of graft of 1–10 percent by weight.

* * * * *

UNITED STATES PATENT AND TRADEMARK OFFICE
CERTIFICATE OF CORRECTION

PATENT NO. : 4,948,842
DATED : August 14, 1990
INVENTOR(S) : Errol J. Olivier

It is certified that error appears in the above—identified patent and that said Letters Patent is hereby corrected as shown below:

Column 11, Claim 1, Line 68, insert "a" before "polyene";

Column 12, Claim 10, Line 41, replace "as" with "or";

Column 12, Claim 13, Line 65, insert "a" before "polyene"; and

Column 13, Claim 13, Line 8, replace "where" with "wherein"

Signed and Sealed this

Eleventh Day of February, 1992

Attest:

HARRY F. MANBECK, JR.

*Attesting Officer*     *Commissioner of Patents and Trademarks*